United States Patent
Imafuku

(10) Patent No.: US 12,205,066 B2
(45) Date of Patent: Jan. 21, 2025

(54) INFORMATION PROCESSING DEVICE, INFORMATION PROCESSING METHOD, AND PROGRAM

(71) Applicant: Yosuke Imafuku, Tokyo (JP)

(72) Inventor: Yosuke Imafuku, Tokyo (JP)

(73) Assignee: Yosuke Imafuku, Tokyo (JP)

( * ) Notice: Subject to any disclaimer, the term of this patent is extended or adjusted under 35 U.S.C. 154(b) by 0 days.

(21) Appl. No.: 18/040,600

(22) PCT Filed: Mar. 9, 2021

(86) PCT No.: PCT/JP2021/009145
§ 371 (c)(1),
(2) Date: Feb. 3, 2023

(87) PCT Pub. No.: WO2022/030043
PCT Pub. Date: Feb. 10, 2022

(65) Prior Publication Data
US 2023/0281554 A1  Sep. 7, 2023

(30) Foreign Application Priority Data

Aug. 5, 2020 (JP) .................................. 2020-132915

(51) Int. Cl.
*G06Q 10/0833* (2023.01)
*G06Q 10/02* (2012.01)
*G06Q 50/40* (2024.01)

(52) U.S. Cl.
CPC ......... *G06Q 10/0833* (2013.01); *G06Q 10/02* (2013.01); *G06Q 50/40* (2024.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

2007/0150375 A1* 6/2007 Yang ..................... G06Q 10/08
705/26.81
2019/0130349 A1   5/2019 Ferguson et al.
(Continued)

FOREIGN PATENT DOCUMENTS

JP    2003022476 A    1/2003
JP    2006182045 A    7/2006
(Continued)

OTHER PUBLICATIONS

James, J. Q., and Albert YS Lam. "Autonomous vehicle logistic system: Joint routing and charging strategy." IEEE Transactions on Intelligent Transportation Systems 19.7 (2017): 2175-2187. (Year: 2017).*

(Continued)

*Primary Examiner* — Emmett K. Walsh
(74) *Attorney, Agent, or Firm* — Osha Bergman Watanabe & Burton LLP

(57) ABSTRACT

The purpose of the present invention is to realize a package holding service that meets users' needs, at a low cost. An operation management unit of a server manages, as moving storage space information, information pertaining to the movement of a locker vehicle provided with a locker capable of storing a package and information pertaining to the locker in the locker vehicle. A site management unit receives a deposit reservation for a package that is input from a depositor terminal. A presentation unit presents necessary information for retrieving the package to a receiver terminal on the basis of the deposit reservation for the package and the moving storage space information.

3 Claims, 5 Drawing Sheets

(56) References Cited

U.S. PATENT DOCUMENTS

2019/0164114 A1\* 5/2019 Kadotani ............. G05D 1/0088
2019/0196479 A1 6/2019 Kaneko et al.
2019/0392370 A1 12/2019 Kashi et al.
2020/0218281 A1 7/2020 Ono
2021/0256472 A1\* 8/2021 Javidan .................. H04W 4/12

FOREIGN PATENT DOCUMENTS

| JP | 2012073685 A | 4/2012 |
| JP | 2019096201 A | 6/2019 |
| KR | 10-2013-0106036 A | 9/2013 |
| KR | 10-2019-0079497 A | 7/2019 |
| WO | 2019039014 A1 | 2/2019 |

OTHER PUBLICATIONS

Office Action issued in Korean Patent Application No. 10-2023-7007746, mailed on Jul. 3, 2023 (11 pages).
International Search Report issued in International Application No. PCT/JP2021/009145, mailed Apr. 27, 2021 (5 pages).
Written Opinion issued in International Application No. PCT/JP2021/009145; Dated Apr. 27, 2021 (3 pages).

\* cited by examiner

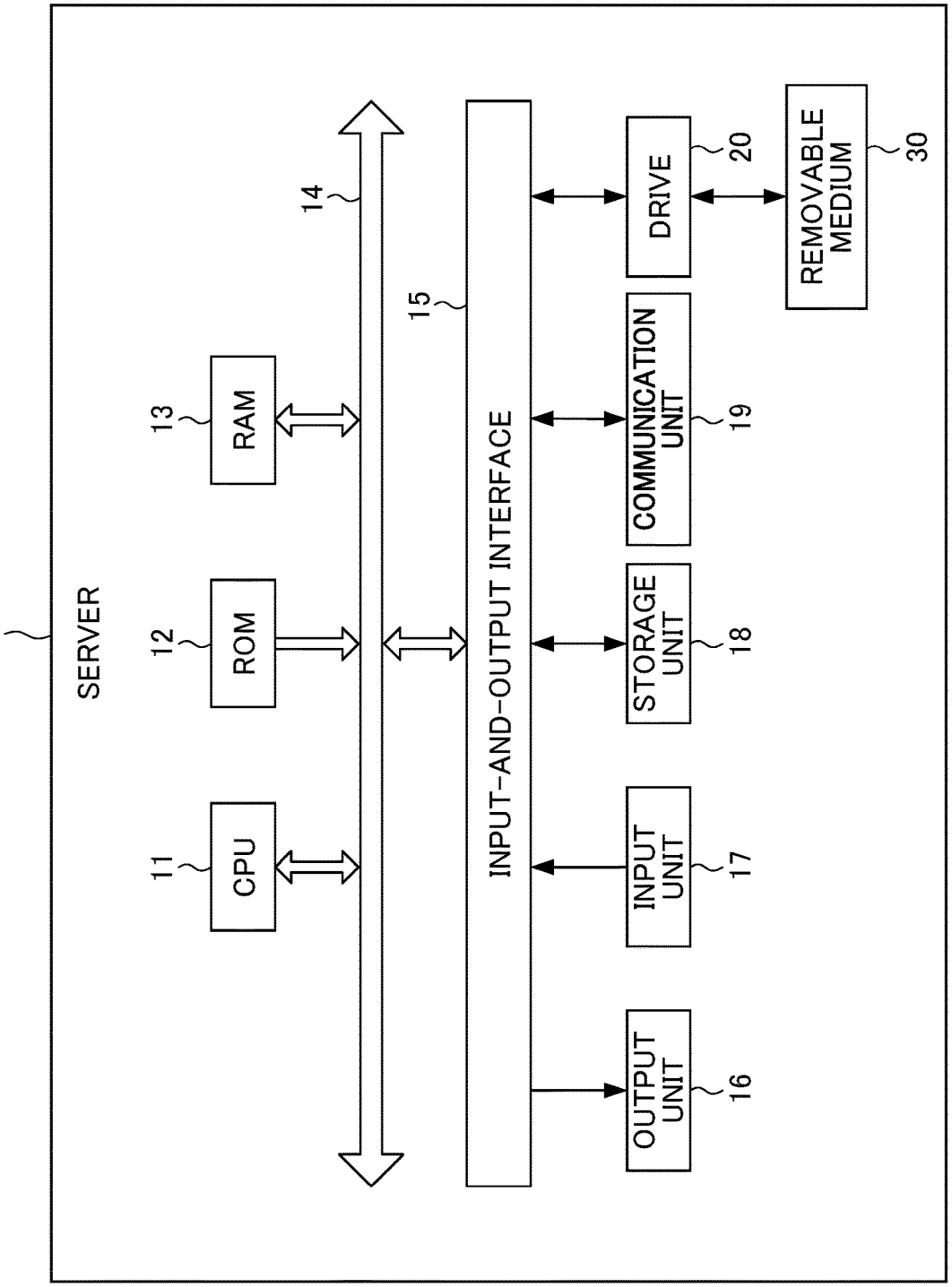

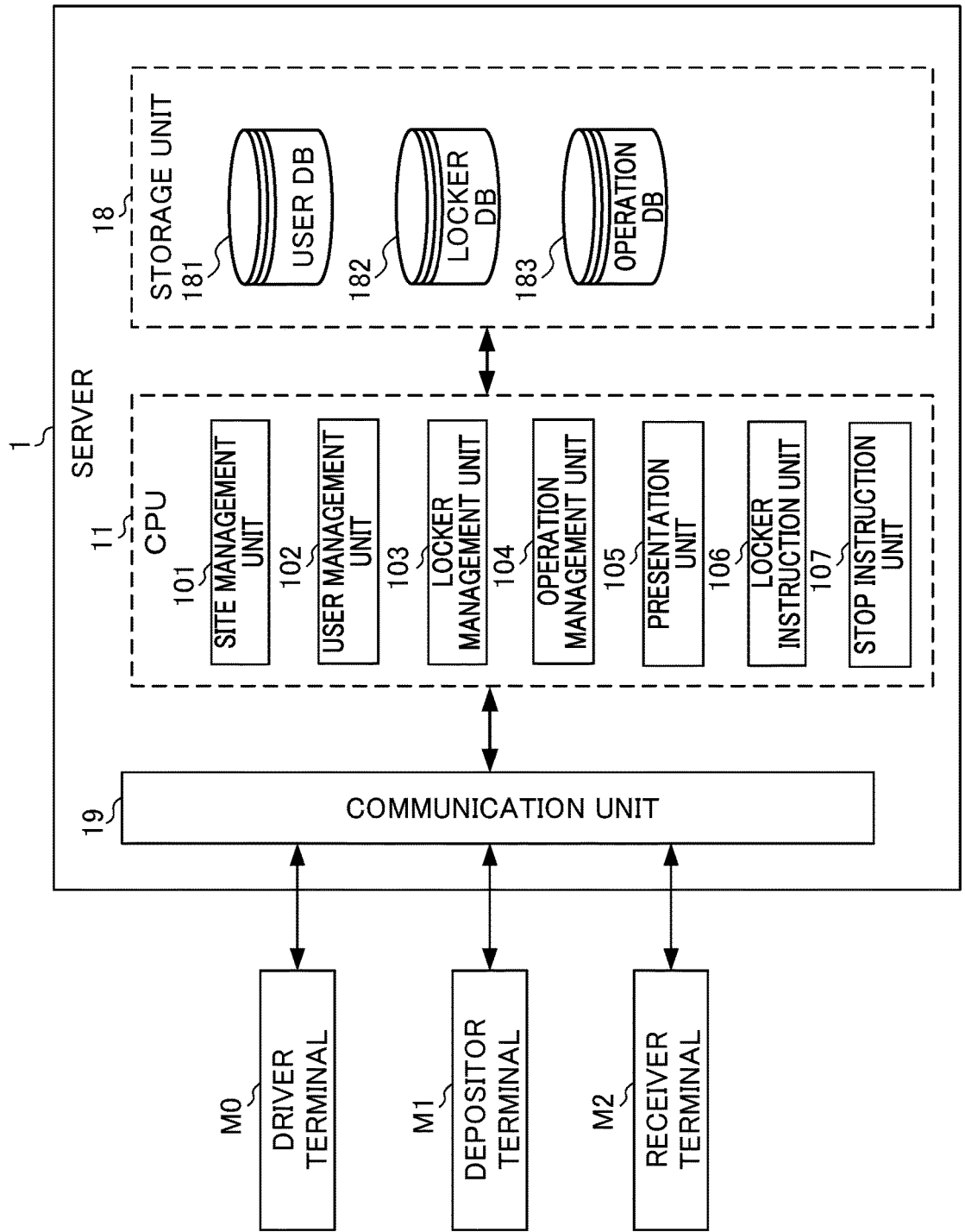

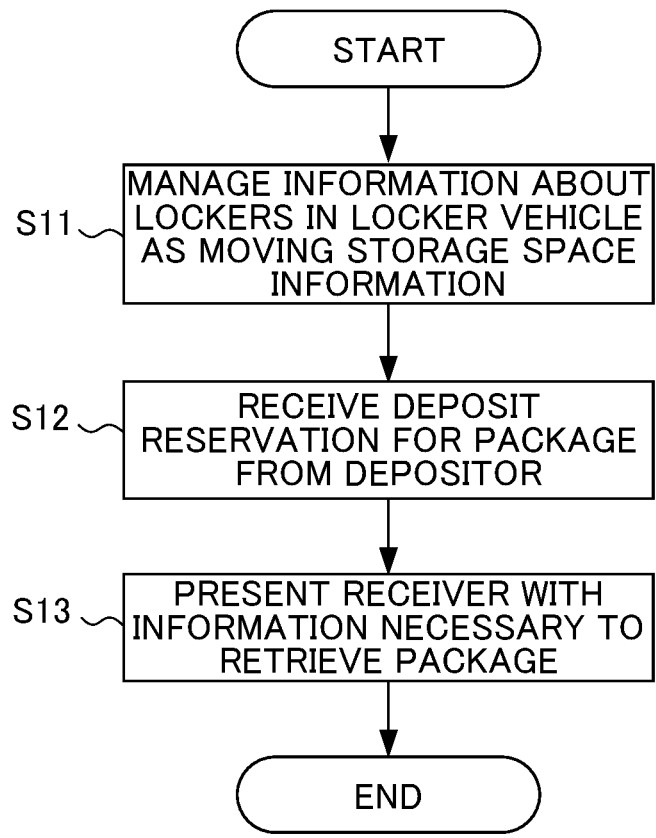

INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

In recent years, as the demand for package delivery service has increased, there are many users who do not like to have their packages delivered to their homes because the delivery time is uncertain or they are often away from home. Meanwhile, a service has started that enables receipt of packages at a station by providing a railroad station, etc., with delivery lockers (see Patent Document 1). This service seems to satisfy the demands of the above users, but has limited usage conditions, such that only packages from specific mail order sites and delivery companies can be delivered, and in addition, for the delivery companies trying to newly enter this service, the cost for deploying lockers at stations is high, which is a hindrance to their new entry under the current situation.

Patent Document 1: Japanese Unexamined Patent Application, Publication No. 2012-073685

DISCLOSURE OF THE INVENTION

Problems to be Solved by the Invention

As described above, conventionally, while there are needs of users who dislike having their packages delivered to their homes, it is costly to provide a package holding service by providing delivery lockers in public places such as stations, for example, and therefore, it is difficult for the companies to newly enter this type of business.

The present invention has been made in view of the situation, and a purpose of the present invention is to realize a package holding service that meets users' needs at a low cost.

Means for Solving the Problems

In order to achieve the above object, an information processing device of one aspect of the present invention includes:
management section for managing, as moving storage space information, information about movement of a moving body including a storage space capable of storing a package, and information about the storage space in the moving body;
receiving section for receiving a reservation for the package including information on each of a location where the package is to be deposited in a predetermined moving body and the storage space in which the package is stored, the information being input from at least one of a depositor and a receiver of the package; and
presentation section for presenting at least the receiver among the depositor and the receiver with information necessary for retrieving the package from the predetermined moving body at any location of one or more locations preset on a moving route of the moving body, based on a reservation for the package and the moving storage space information. Note that an information processing method and a program corresponding to the above-mentioned information processing device that is one aspect of the present invention are also provided as an information processing method and a program that are one aspect of the present invention.

Effects of the Invention

According to the present invention, it is possible to realize a package holding service that meets users' needs at a low cost.

BRIEF DESCRIPTION OF THE DRAWINGS

FIG. 3 is a block diagram illustrating an example of a hardware configuration of the server in the information processing system illustrated in FIGS. 1 and 2;

FIG. 4 is a functional block diagram illustrating a functional configuration for executing processing pertaining to the present service among functional configurations of the server in FIG. 5; and FIG. 5 is a flowchart illustrating operation of the server in the functional configuration of FIG. 4.

PREFERRED MODE FOR CARRYING OUT THE INVENTION

An embodiment of the present invention will now be described herein with reference to the accompanying drawings. First, with reference to FIG. 1, an outline of services to be supported by an information processing system including a server (see FIGS. 3 and 4) of one embodiment of an information processing device of the present invention will be described.

Figure 1:
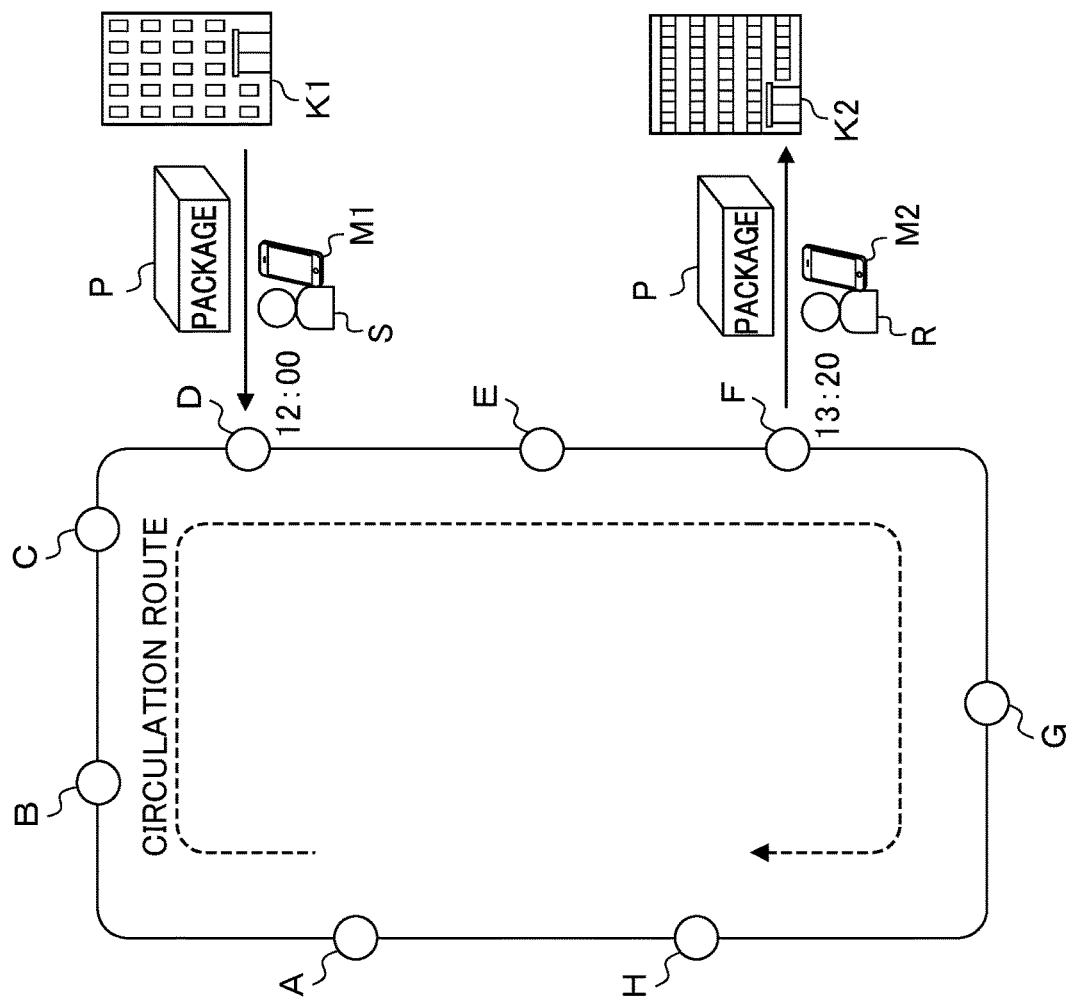
FIG. 1 is a diagram illustrating an outline of an example of a package holding service (hereinafter referred to as "the present service") with a locker vehicle.
Figure 1:
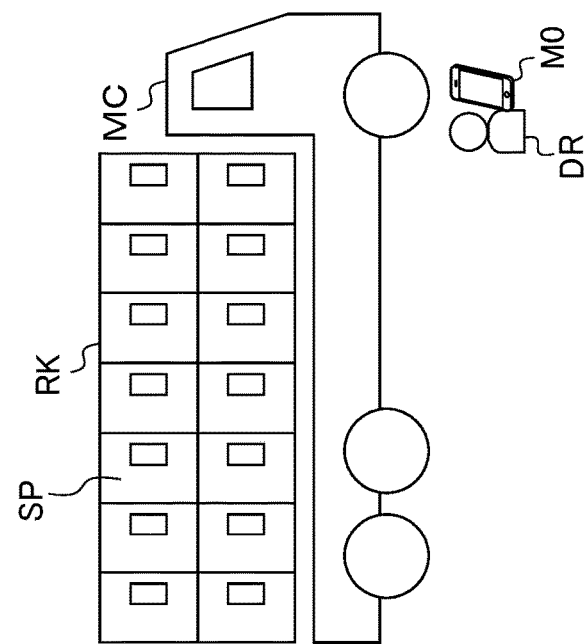

FIG. 1 is a diagram illustrating an outline of an example of a package holding service with a locker vehicle (hereinafter referred to as "the present service").

The present service is provided by a service provider (service provider SA in FIG. 2 described later). As illustrated in FIG. 1, the present service provides users with a holding service for packages P such that a locker vehicle MC travels around a predetermined circulation route and stops at the predetermined stop locations A to H, and during the stop, the packages P are delivered to/received from users such as depositors S and receivers R via lockers RK equipped on the locker vehicle MC.

Specifically, in the present service, a vehicle equipped with lockers RK with one or more storage boxes SP, that is, a locker vehicle MC, driven by a driver DR, travels around a predetermined circulation route. In the locker vehicle MC, a driver terminal M0 to be operated by the driver DR is disposed through which various instructions are transmitted from the service provider SA to the driver terminal M0.

One or more stop locations, such as stop locations A to H are set on the circulation route, but these are only set on an application screen, and no special signboards or stopping facilities are installed at the actual locations, and therefore, no cost pertaining to infrastructure development other than the vehicle is required.

According to a preset operation plan, the locker vehicle MC stops at each of the stop locations A to H at a predetermined time and just for a predetermined period of the stop time, and then moves toward the next stop location. The predetermined period of stop time is, for example, 10 minutes or so, and the depositors S and the receivers R who visit the stop location during that period can deposit the packages P in the locker RK and can retrieve the package P from the locker RK, respectively. The predetermined period of stop time described here is an example, and other periods of time may be used.

With the present service, a reservation for depositing the package is basically made in advance, and then the package is to be deposited in a reserved storage box SP. Note that if there is a storage box SP that has not been reserved at the stop location, the package P can also be deposited through the deposit procedure on the spot.

As an example, a depositor S who is an employee of a company K1 operates a depositor terminal M1 to make a reservation for depositing a package P in a locker vehicle MC arriving at a stop location D at 12:00, for example, and he/she deposits the package P in the locker vehicle MC that has arrived at the stop location D at 12:00.

With the present service, at the same time as the reservation is made or at a timing when the package P is deposited in the locker vehicle MC, the information necessary for retrieving the package P is presented or distributed to a receiver terminal M2 operated by the receiver R who is an employee of the company K2.

The information necessary for retrieving the package P to be presented includes, for example, the arrival time of the locker vehicle MC at each of the stop locations E to C after the stop location D, the door number and unlocking information of the storage box SP of the package P and such.

According to the information necessary for retrieving the package P presented on receiver terminal M2, the receiver R can go to the stop location F at 13:20 when the locker vehicle MC is scheduled to arrive, and retrieve the package P from the locker vehicle MC that has arrived at the stop location F and receive the package.

Note that it is not always necessary to retrieve the package P from the locker vehicle MC that arrives at the stop location F at 13:20, but it may also be possible to retrieve the package P at another stop location at a different time. Furthermore, with the present service, the locker vehicle MC is operated in a regular run of traveling around the circulation route at regular time intervals, therefore, at the next time when the locker vehicle MC travels around on the circulation route and arrives at the stop location F, the receiver R may go to the stop location F and retrieve the package P from the traveling locker vehicle MC.

As described above, according to the present service, after the depositor S deposits the package P in the locker vehicle MC at a predetermined stop location on the circulation route, the receiver R can retrieve the package P from the locker vehicle MC at a desired stop location and time on the circulation route, and therefore, the receiver R can receive the package P at the desired stop location and time on the circulation route without waiting for the arrival of the package P at the company K2. This makes it possible to realize a holding service for packages P that meets needs of the receiver R at a low cost.

Next, with reference to FIG. 2, an information processing system that realizes provision of the present service described above, that is, a configuration of an information processing system including a server 1 according to one embodiment of the present invention will be described. FIG. 2 is a diagram illustrating the configuration of the information processing system including a server according to one embodiment of the present invention.

Figure 2:
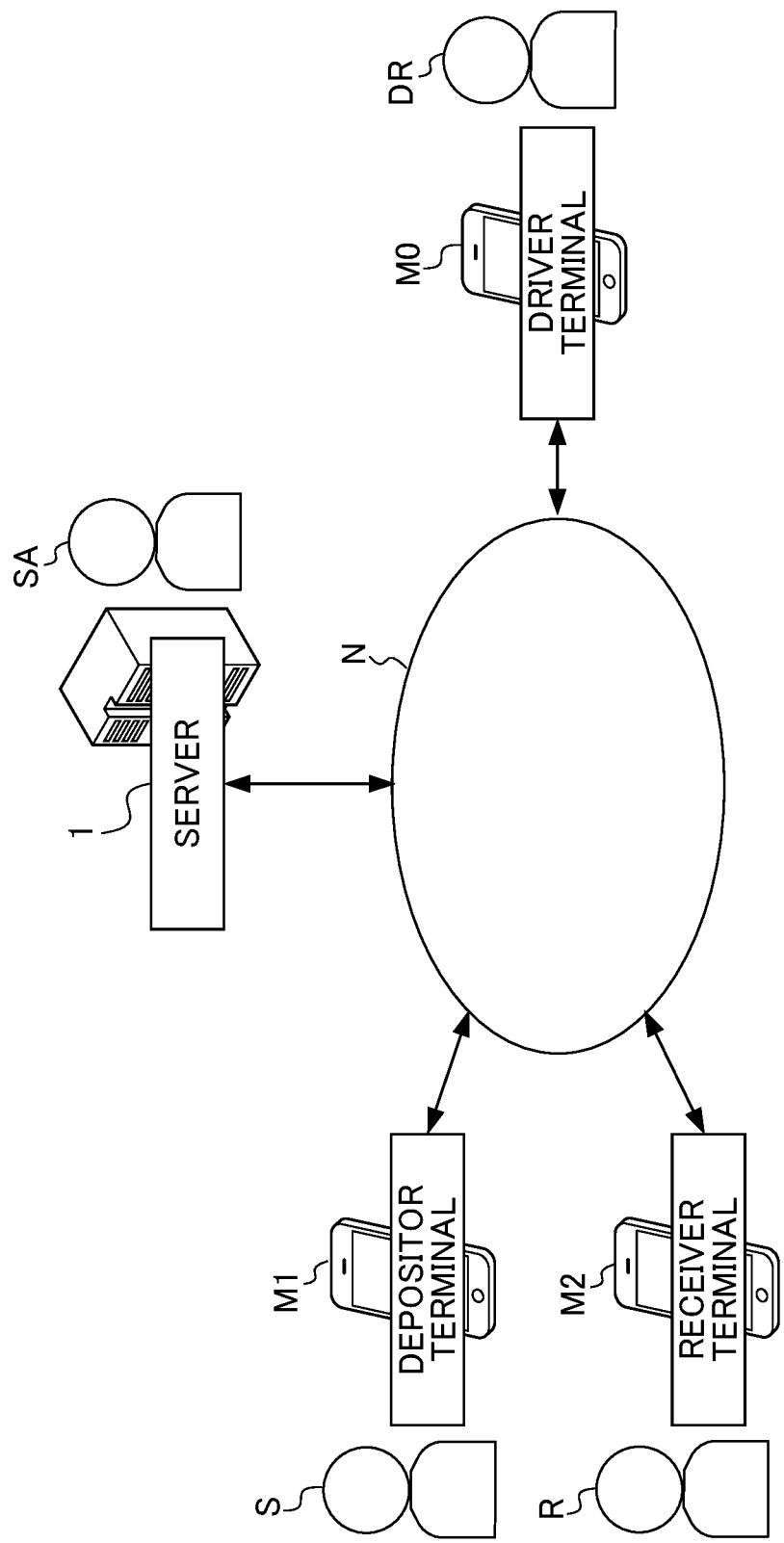
FIG. 2 is a diagram illustrating a network configuration of an information processing system including a server according to one embodiment of the present invention applied to the present service of FIG. 1.

The information processing system illustrated in FIG. 2 is configured to include a server 1, a depositor terminal M1, a receiver terminal M2, and a driver terminal M0. The server 1, the depositor terminal M1, the receiver terminal M2, and the driver terminal M0, respectively, are communicably coupled to each other via a predetermined network N such as the Internet.

The server 1 is managed by the service provider SA, and executes various types of processing for realizing the present service while appropriately communicating with the depositor terminal M1, the receiver terminal M2, and the driver terminal M0. Specifically, the server 1 supports a holding service for packages P of a locker vehicle MC that travels around the predetermined circulation route including one or more stop locations A to H.

The depositor terminal M1 is an information processing device operated by the depositor S, and is configured with, for example, a personal computer, a smart phone, or a tablet. From the depositor terminal M1, it is possible to access the reservation site managed by the server 1 and make a reservation for depositing the package P in the locker vehicle MC.

The receiver terminal M2 is an information processing device operated by the receiver R, and is configured with, for example, a personal computer, a smart phone, or a tablet.

The receiver terminal M2 displays websites managed by the server 1. The websites present the information necessary for retrieving the package P deposited in the locker vehicle MC from the predetermined storage box SP. Therefore, the receiver R can view the presented content to retrieve the package P from the locker vehicle MC.

The driver terminal M0 is an information processing device operated by the driver DR, and is configured with, for example, a personal computer, a smart phone, or a tablet.

The driver terminal M0 starts a driver App managed by the server 1 as an App for the present service. As a result, the driver DR can respond to an instruction to change the stop location or change the locker configuration on the driver App screen displayed on the display unit of the driver terminal M0.

FIG. 3 is a block diagram illustrating an example of the hardware configuration of the server in the information processing system illustrated in FIG. 1.

The server 1 includes a central processing unit (CPU) 11, a read only memory (ROM) 12, a random access memory (RAM) 13, a bus 14, an input-and-output interface 15, an output unit 16, an input unit 17, a storage unit 18, a communication unit 19, and a drive 20.

The CPU 11 executes various types of processing in accordance with programs recorded in the ROM 12 or programs loaded from the storage unit 18 to the RAM 13. The RAM 13 appropriately stores, data, etc., necessary for the CPU 11 to execute various types of processing.

The CPU 11, the ROM 12 and the RAM 13 are coupled to each other via the bus 14. The bus 14 is further coupled to the input-and-output interface 15. The input-and-output interface 15 is coupled to the output unit 16, the input unit 17, the storage unit 18, the communication unit 19, and the drive 20.

The output unit 16 is configured with a display such as a liquid crystal display, a speaker, etc., and outputs various types of information as images and sounds. The input unit 17 is configured with, for example, a keyboard, etc., and outputs various types of information. The storage unit 18 is configured with a dynamic random access memory (DRAM), etc., and store various types of data. The communication unit 19 communicates with other devices (for example, the driver terminal M0, the depositor terminal M1, the receiver terminal M2, etc., in FIGS. 1 and 4) via the network N including the Internet.

The drive 20 is appropriately equipped with a removable medium 30 composed of a magnetic disk, an optical disk, a magnetic optical disk, a semiconductor memory, or the like. A program read from the removable medium 30 by the drive 20 is installed in the storage unit 18 as required. In addition, the removable medium 30 can also store various types of data stored in the storage unit 18 in the same manner as the storage unit 18.

Note that, although not illustrated, the depositor terminal M1, receiver terminal M2, and driver terminal M0 in FIGS. 1 and 2 also have basically the same hardware configuration as the one that is illustrated in FIG. 3, and the description of each configuration is omitted.

Such cooperation between various types of hardware and various types of software of the server 1 in FIG. 3 makes it possible to execute various types of processing including the processing of supporting the package holding service in the server 1. As a result, the service provider SA can provide the above-described present service to the users. "Processing for supporting the package holding service" means the processing for managing the present service described above. The following describes a functional configuration for executing processing that supports the package holding service, which is executed in the server 1.

FIG. 4 is a functional block diagram illustrating a functional configuration for executing processing pertaining to mobile lockers, among the functional configurations of the server 1 having the hardware in FIG. 3.

As illustrated in FIG. 4, in a case in which the execution of net supermarket management processing is controlled in the CPU 11 of the server 1, the following units function: a site management unit 101, a user management unit 102, a locker management unit 103, an operation management unit 104, a presentation unit 105, a locker change instruction unit 106, and a stop change instruction unit 107.

The site management unit 101 discloses the websites provided by the present service on the Internet. The websites include, for example, a reservation site, a user's My Page, and a special App management site, etc.

For example, when the reservation site is accessed from the depositor terminal M1 of the depositor S, the site management unit 101 reads vacancy information of the storage box SP of the locker RK at the time of use from the locker DB 182 and presents it to the depositor terminal M1.

The site management unit 101 receives a deposit reservation for the package P input from at least one (of the terminal M1 or M2) of the depositor S and the receiver R of the package P on the reservation site.

For example, the deposit reservation for the package P includes information about the first stop location (for example, the stop location D, etc.) where the package P is deposited in the locker vehicle MC, information about a predetermined storage box SP for storing the package P among the one or more storage boxes SP of the locker RK, and information about the receiver R.

The information about the first stop location where the package P is deposited in the locker vehicle MC includes the position and name of the stop location D (identification information such as the stop location number), and a time when the locker vehicle MC stops and a period of stop time until the departure, etc. The information about the storage box SP that stores the package P is, for example, the door number of the storage box SP. The information about the receiver R is, for example, a user ID.

In other words, the deposit reservation for the package P is a reservation such as that the package P is deposited in the storage box SP with the predetermined door number "xxx" in the locker RK of the locker vehicle MC that is to stop at the stop location D at O:X, so the receiver R should retrieve it.

Note that by associating the user ID of the depositor S with the user ID of the receiver R in advance, input of receiver R's information can be omitted. Also, if the depositor S and the receiver R are the same user (user ID), input of receiver R's information can be omitted.

The user management unit 102 manages the user information registered by the depositor S and the receiver R as users of the present service, on the websites of the service provider SA, using the user DB 181. Specifically, the user management unit 102 stores and manages the user information of the depositor S and the receiver R in the user DB 181. The user information registered in the user DB 181, such as the user ID of the depositor S of the company K1, the user ID of the receiver R of the company K2, and the contact information (phone number, e-mail address, etc.) of each user, and the payment method in utilizing the service, is stored.

In addition, the user ID of a specific user, such as a premium member, is flagged to be identified. A user having a user ID that satisfies conditions of being flagged can receive preferential treatment. The user can receive preferential treatment such that the locker vehicle MC can be stopped at a specified location (for example, nearby the company where the user works or nearby the home) regardless of the stop locations A to H set on the circulation route in making a deposit reservation or in retrieving the package P, for example.

The locker management unit 103 manages information about lockers RK in the locker vehicle MC. The information about the lockers RK includes, for example, the door number of the storage box SP in which the package P is accommodated, and the vacancy information of the storage box SP in the locker RK and the like. Specifically, the locker management unit 103 stores and manages the door number of the storage box SP in the locker RK in which the package P is accommodated, the vacancy information of the storage box SP in the locker RK, and the like in the locker DB 182.

The locker DB 182 stores information about the locker RK as well as the information of deposit reservation reserved by the user. The information of the deposit reservation is information such as that a package P is deposited in a storage box SP with a predetermined door number in a locker RK of a predetermined locker vehicle (locker vehicle MC) that is to stop at a predetermined stop location, such as a stop location D, etc., at O:X, so the receiver R should retrieve it.

The operation management unit 104 manages, using the locker DB 182 as moving storage space information, information about the movement of the locker vehicle MC provided with the locker RK composed of one or more storage boxes SP as a storage space capable of storing the package P and information about the locker RK (storage boxes SP) in the locker vehicle MC.

The information about the movement of the locker vehicle MC includes, for example, the circulation route of the locker vehicle MC, and information of the time the locker vehicle MC stops for each of the one or more stop locations A to H preset on the circulation route (moving route) of the locker vehicle MC.

The information of the time the locker vehicle MC stops includes, for example, the period of stop time (10 minutes) including the arrival time of 12:00 and the departure time of 12:10 in the case of the stop location D.

The information about the locker RK (storage boxes SP) includes the door number of the storage box SP in which the package P is accommodated, and the vacancy information of the storage box SP of the locker RK, etc. The vacancy information includes, for example, information indicating whether the storage box SP is actually utilized (occupied) or not (vacant) for the reservation. Specifically, the operation management unit 104 detects the presence or absence of the package by sensors (for example, a door open-close sensor and an object detection sensor in each storage box SP) provided in each storage box SP, and updates the data of the relevant storage box SP in the locker DB 182.

Based on the reservation for the package P and the moving storage space information, the presentation unit 105 presents the information, which is necessary for retrieving the package P from the locker vehicle MC at any of one or more stop locations A to H preset on the circulation route, at least to the receiver terminal M2 of the receiver R among the depositor S and the receiver R.

The information, which is necessary for retrieving the package P from the locker vehicle MC, includes: each time and time period of stop locations E, F, G, H, A, B, and C where the locker vehicle MC stops after stop location D; and the door number of the storage box SP of the locker vehicle MC in which the package P is accommodated and the unlocking information of the door (unlocking code, personal identification number, etc.), for example.

Specifically, the presentation unit 105 reads the deposit reservation information stored in the locker DB 182 and the user information stored in the user DB 181, and presents the information necessary for retrieving the package P from the locker vehicle MC to the receiver terminal M2 of the receiver R, based on the read deposit reservation information.

As for a method of presenting necessary information to receiver terminal M2 of receiver R, for example, the necessary information may be distributed to an e-mail address included in the user information of the user DB 181, or presented to the receiver R by uploading the necessary information to a My Page prepared for the receiver R. As a result, the receiver R is able to know that the package is deposited in the locker vehicle MC, and receive the package at a desired stop location F or others from among the stop locations E, F, G, H, A, B, and C.

The locker vehicle MC has a configuration that allows the locker RK to include a plurality of storage boxes SP. Further, on the service provider SA side, a plurality of types of locker vehicles MC with different configurations of lockers RK are prepared. The locker instruction unit 106 outputs an instruction, depending on the type of the package P, to change at least a part of the type of the locker vehicle MC and the type and number of the storage box SP provided in the locker vehicle MC, to the driver terminal M0 of the locker vehicle MC. The instruction for change is changed depending on the user's demand. The instruction for change includes, for example, an instruction to increase the number of cold storage spaces, or to change the storage box SP to the one with a large capacity for large package, in each storage box SP of the locker RK. As a result, the locker configuration can be rearranged depending on a demand.

In case that a predetermined location is specified as a location to deposit the package P by a depositor S who satisfies a predetermined condition or as a location to receive the package P by a receiver R, in the deposit reservation, a stop instruction unit 107 outputs an instruction to stop at the predetermined location. Specifically, as the predetermined condition, for example, if the depositor S or the receiver R is a specific user such as a premium member or if the specific user specifies a predetermined location (for example, a location other than the stop locations A to H) at the time of deposit reservation, the stop instruction unit 107 sends an instruction to the driver terminal M0 of the locker vehicle MC to stop at the predetermined location.

In this way, according to the functional configuration of the server 1 in FIG. 4, when a deposit reservation for package P is input from a depositor terminal M1 on the reservation site, based on the deposit reservation for the package P and the moving storage space information in the locker DB 182 and the operation DB 183, the presentation unit 105 presents the receiver terminal M2 with the information necessary for retrieving the package P including the door number of the storage box SP in which the package P is deposited and the unlocking information of the door, and the time the locker vehicle MC stops at the stop locations E, F, G, H, A, B, and C after the stop location D, etc., therefore, the receiver R can go to a stop location E, F, G, H, A, B, or C at a time convenient for himself/herself to retrieve the package P deposited in the locker vehicle MC.

Next, operation of the server will be described with reference to the flowchart in FIG. 5. FIG. 5 is a flowchart illustrating the operation of the server.

In the step S11 of FIG. 5, the operation management unit 102 manages, as the moving storage space information, the circulation route of the locker vehicle MC provided with the lockers RK capable of storing the package P and each stop time at the one or more stop locations A to H on the circulation route, and the vacancy information of locker numbers and the storage boxes of the locker in the locker vehicle MC, etc.

In the step S12, the site management unit 101 receives the deposit reservation for package P, input from the depositor terminal M1, including the information of the stop location D for depositing the package P in the locker vehicle MC and the predetermined storage box SP for storing the package P.

In the step S13, the presentation unit 105 presents the information necessary for retrieving the package P, to the receiver terminal M2 of the receiver R, based on the deposit reservation for the package P received by the site management unit 101 and the moving storage space information managed by the operation management unit 102. For example, the information necessary for retrieving the package P includes the door number of the storage box SP in which the package P is deposited and the unlocking information of the door, and the time the locker vehicle MC stops at the stop locations E to C after the stop location D.

As described above, according to the operation of the server 1 illustrated in FIG. 5, when the deposit reservation for the package P is received, the information necessary for retrieving the package P is presented to the receiver terminal M2 of the receiver R, therefore, the receiver R can view the presented information to know when and which stop location E, F, G, H, A, B, or C to go to receive the package P, which allows the receiver R to receive the package P at a time and location suitable for him/her.

In the above-described embodiment, it is explained that the locker vehicle MC as a moving body is driven by the driver DR and instructions are output to the driver DR to rearrange the locker configuration and change the stop location, but alternatively, if the locker vehicle MC is, for example, an autonomous vehicle, the computer loaded on the moving body may receive the instructions to control the moving body. Also, for an autonomous vehicle, instructions may be output to a control system or the like that controls the autonomous vehicle from the outside. As a result, since autonomous vehicles that do not require a driver DR can also be operated in the present service, the operating costs can be reduced.

Also, in the above-described embodiment, one circulation route has been described as an example, but a plurality of routes (systems) may be set like a transportation system such as buses. For example, a plurality of storage boxes SP of the locker vehicles MC illustrated in FIG. 1 are made individually detachable, and a first circulation route that includes stop locations A to H and a second circulation route that includes stop locations I, J, K as well as the stop location H are set, and different locker vehicles MC are made to travel around on the respective circulation routes to operate. In this case, by transferring a storage box SP between the two locker vehicles MC at the stop location H where the circulation routes intersect with each other, it becomes possible to deliver in the other route by the transfer of the package P in such a way that the package P loaded at the stop location D in the first circulation route is transferred to the stop location K in the second circulation route and then unloaded there, for example. As a result, it becomes possible to select in a flexible manner to receive the package P.

Also, the circulation routes may be expanded nationwide and applied to long-distance services such as tour buses. Furthermore, in the above-described embodiment, a fixed route is exemplified and explained as a circulation route, but without limiting to this example, the circulation route may be changed depending on a demand forecast, for example.

Furthermore, in the above-described embodiment, it is explained as the locker vehicle MC dedicated to packages P, however, for example, a large vehicle (such as a bus-type vehicle) having seats and lockers disposed in the front and rear can be used to transfer packages and people at the same time.

In the above-described embodiment, the case that the package P is sent from the company K1 to the company K2 is explained, but alternatively, the case may also be such that a locker vehicle MC travels around chain stores of the same company to interchange the commodities between the stores depending on the demand of each store, for example. Also, it may be applied to joint shipping between a plurality of supermarkets so that each supermarket picks up the required amounts of commodities from the moving body, for example.

In the above-described embodiment, the locker vehicle MC comes nearby the company or home on the circulation route, but it is necessary to manually transfer the package P between the company or home and the locker vehicle MC. Therefore, entry of a delivery service can be expected that delivers short distances such as between a company or home and the locker vehicle MC.

In the above-described embodiment, detailed description is not made on a method of loading and unloading the package P into and out of the locker RK of the locker vehicle MC, however, an example method allows the package P to be taken in and out respectively with the depositor terminal M1 and the receiver terminal M2 without using a physical key by including an application program (hereinafter referred to as an "App") installed in the depositor terminal M1 and the receiver terminal M2 respectively, an established NFC function installed in each terminal, and locking devices with non-contact NFC function provided in each storage box SP of the locker RK.

Specifically, when the depositor S loads the package P into a predetermined storage box SP and closes the door, the depositor terminal M1 is brought close to a NFC unit of the locking device of the storage box SP so that the App of the depositor terminal M1 receives an electronic key (encryption key) from the NFC unit and locks the storage box SP. When the receiver R unloads the package P from the predetermined storage box SP, the receiver terminal M2 is brought close to the NFC unit of the locking device of the predetermined storage box SP, and thereby, the electronic key is transferred between the App of the receiver terminal M2 and the locking device to unlock the storage box SP, so that the door of the storage box SP is opened. As a result, the receiver R can unload the package P from the predetermined storage box SP. Thus, introduction of such a structure for locking and unlocking through transfer of the electronic key with NFC makes it possible to deliver the package P with the locker vehicle MC under high security.

In addition, the configuration may be such that a locking device capable of setting a passcode is only attached to the door of the storage box SP without using the Apps, the electronic keys, the locking device with NFC of the depositor terminal M1 or the receiver terminal M2, etc. The passcode is, for example, characters with a predetermined number of digits (eight digits, etc.) including both alphabets and numbers. Note that the passcode may be other than the example described here. In this case, the door of the storage box SP is locked with the passcode input by the depositor S in loading. Also, in unloading, the receiver R unlocks the door of the storage box SP with the passcode notified to the receiver R by e-mail, phone, etc. from the depositor S. This makes it possible to achieve delivery of the package P with the locker vehicle MC with a simple configuration.

Further, the system configuration illustrated in FIG. 2 and the hardware configuration of the server illustrated in FIG. 3 are merely examples for achieving the object of the present invention, and are not particularly limited.

Furthermore, the functional block diagram illustrated in FIG. 4 is a mere example, and is not particularly limited. In other words, it is enough if an information processing system has functions that are able to execute the series of processing described above as a whole, and what kind of functional blocks and databases are used to achieve the functions are not particularly limited to the example in FIG. 4.

Further, the locations where the functional blocks and the database exist are not limited to those in the above embodiment, and may be arbitrary. Furthermore, the one functional block and one database may be configured with a single piece of hardware, a single piece of software, or a combination of those.

In executing processing of each functional block and database with software, a program configuring the software is installed into a computer, etc., from a network or a recording medium. The computer may be such a computer incorporated in a dedicated hardware. Furthermore, the computer may be such a computer that can execute various functions, with various programs being installed, such as general-purpose smart phones or personal computers, other than servers.

A recording medium storing such programs as described above is not only configured with a removable medium distributed to each user separately from a device main body to provide the programs, but also is configured with a recording medium assembled beforehand in the device main body to provide the programs to each user, for example.

Note that, in the present description, steps describing programs recorded in a recording medium includes not only the processing sequentially executed in a chronological order, but also the processing executed in parallel or separately that may not necessarily be executed in a chronological order.

In summary, the information processing device to which the present invention is applied (for example, the server 1 in FIG. 4) only needs to have the following configuration, and can take a variety of different embodiments. In other words, the information processing device to which the present invention is applied includes:

management section (for example, the operation management unit 104 in FIG. 4) that manages, as moving storage space information, information about movement of a moving body (locker vehicle MC) including a storage space (a locker RK composed of one or more storage boxes SP, etc.) capable of storing the package P, information about a circulation route and the time the locker vehicle stops for each of one or more stop locations A to H (the arrival time (12:00), the departure time (12:10), and the period of stop time (10 minutes), etc.), and information about the storage space (locker RK) in the moving body (locker vehicle MC) (the door number of the storage box SP in which the package P is accommodated and the vacancy information of the storage box SP of the locker RK, etc.) receiving section (for example, the site management unit 101 in FIG. 4) that receives a reservation for the package P (reservation for depositing package P in the storage box SP with a predetermined door number of locker RK of the predetermined locker vehicle MC that stops at predetermined stop location D at O:X), which includes information of a location (for example, a stop location D, etc.) where the package P, input from at least one of the depositor S and the receiver R of the package P (at least one of the terminals M1 and M2), is deposited in a predetermined moving body (locker vehicle MC), and the storage space (the door number of the storage box SP) in which the package P is stored, presentation section (for example, the presentation unit 105 in FIG. 4) that presents at least (the receiver terminal M2 of) the receiver R among the depositor S and the receiver R with information necessary for retrieving the package P from the predetermined moving body (locker vehicle MC) at any of the one or more locations (stop locations A to H), based on the reservation for the package P and the moving storage space information (each time and time period at the stop locations E to C where the locker vehicle MC stops after stop location D, the door number of the storage box SP of the locker vehicle MC in which the package P is accommodated, and the unlocking information of the door, etc.). As a result, it is possible to build a structure that allows users to deposit (send) and receive the package P on-time. In the present invention, if the package P is just deposited in the moving body (locker vehicle MC) at the predetermined stop location D, the receiver R can retrieve the package at a desired stop location among one or more stop locations A to H on the circulation route of the moving body (locker vehicle MC), which makes it possible to catch users' needs who do not want to have their packages delivered to their homes. In addition, since the moving body (locker vehicle MC) only travels around on the circulation route, no cost is required to install lockers at stations, etc., and the holding service for packages P can be realized at a low cost. Furthermore, by promoting the automated operation of moving bodies (locker vehicles MC), it is possible to eliminate needs for drivers and further reduce operating costs. In other words, it is possible to realize a package holding service that meets users' needs at a low cost.

The moving body (locker vehicle MC) has a configuration that allows the storage space (locker RK) to include a plurality of storage boxes SP, in which a plurality of types of the moving bodies (locker vehicles MC) with the different configurations are prepared, and the information processing device to which the present invention is applied includes:

locker configuration change instruction section (for example, locker instruction unit 106 in FIG. 4) that outputs an instruction to change at least a part of the types of the moving bodies (locker vehicles MC) and the types and numbers of the storage spaces (storage boxes SP) provided in each moving body (locker vehicle MC), depending on the types of packages P, to (the driver terminal M0 of) the moving body (locker vehicle MC) in which the instruction includes increase in the number of cold storage boxes in each storage box SP of the locker RK, or change in some storage boxes SP to the ones with a large capacity for large package. With this configuration, the number and types of packages P to be deposited can be predicted based on demand forecasts made by AI, to change at least a part of the types of moving bodies (locker vehicles MC) and the types and numbers of storage spaces (storage boxes SP) provided for each moving body (locker vehicle MC), depending on the number and types of packages P. In other words, change in the configuration of the storage space (the storage box SP of the locker RK) depending on demand, can achieve a package holding service that meets the users' needs who would like to deposit large packages.

The information processing device to which the present invention is applied includes stop location instruction section (for example, the stop instruction unit 107 in FIG. 4) that outputs an instruction to stop at the predetermined location (for example, to the driver terminal M0 of the locker vehicle MC) if a depositor S who satisfies predetermined conditions (conditions of being a specific user such as a premium member) specifies a desired location as a location to deposit the package P in the reservation, or if a receiver R who satisfies predetermined conditions (conditions of being a special treatment person such as a VIP) specifies a desired location as a location to receive the package P in the reservation. In this way, in making a reservation to deposit package P in the locker vehicle MC, the moving body (locker vehicle MC) stops at a specified location without being limited to the established stop locations on the circulation route for instruction to stop at a predetermined location from the depositor S or the receiver R who satisfies a predetermined condition (the condition of being a specific user such as a premium member), which makes it possible to realize a package holding service that meets the users' needs who would like to deposit or receive the package nearby their homes or offices, for example.

EXPLANATION OF REFERENCE NUMERALS

1 . . . server, A to H . . . stop location, M0 . . . driver terminal, M1 . . . depositor terminal, M2 . . . receiver terminal, P . . . package, 11 . . . CPU, 18 storage unit, 19 . . . communication unit, 101 . . . site management unit, 102 . . . user management unit, 103 . . . locker management unit, 104 . . . operation management unit, 105 . . . posting unit, 106 . . . locker instruction unit, 107 . . . stop instruction unit

The invention claimed is:

1. An information processing device comprising:

a processor; and a memory coupled to the processor, wherein the memory comprises instructions, which, when executed by the processor, is configured to perform a method comprising:

receiving movement information from an autonomous vehicle,
- wherein the autonomous vehicle is a locker vehicle that comprises a control system and a plurality of storage boxes coupled to a plurality of object detector sensors and a plurality of door open-close sensors,
- wherein the locker vehicle is operated in a regular run of traveling around a predetermined circulation route at a plurality of regular time intervals, and
- wherein the movement information is about movement of the autonomous vehicle around a plurality of stop locations of the predetermined circulation route;

receiving storage space information from the autonomous vehicle using the plurality of object detector sensors and the plurality of door open-close sensors, wherein the storage space information is about a presence of one or more packages in one or more storage spaces in the plurality of storage boxes;

receiving a reservation for a package from a depositor terminal associated with a first user;

determining whether a first user ID associated with the first user satisfies a first predetermined condition;

determining whether a second user ID associated with a second user satisfies a second predetermined condition;

obtaining, from the depositor terminal and in response to determining that the first user ID satisfies the first predetermined condition, a first specified location that is outside the predetermined circulation route,
- wherein the reservation for the package comprises the first specified location where the package is to be deposited in the autonomous vehicle and a predetermined storage box among the plurality of storage boxes in which the package is stored at the first specified location,
- wherein the reservation further comprises an arrival time of the autonomous vehicle at a first stop location among the plurality of stop locations of the predetermined circulation route, identification information of the predetermined storage box for the package, and passcode information for opening the predetermined storage box, and
- wherein the reservation is based on the movement information and the storage space information;

presenting, at a receiver terminal associated with the second user, information for retrieving the package from the autonomous vehicle at the first stop location of the predetermined circulation route preset on based on the reservation for the package;

transmitting, based on the reservation for the package and to the autonomous vehicle, a first stop instruction to stop at the first specified location and a second stop instruction to stop at the first stop location;

obtaining, from the receiver terminal and in response to determining that the first user ID does not satisfy the first predetermined condition and that the second user ID satisfies the second predetermined condition, a second specified location that is outside the predetermined circulation route,
- wherein the reservation for the package comprises a second stop location among the plurality of stop locations of the predetermined circulation route,
- wherein the package is to be deposited in the autonomous vehicle and a predetermined storage box among the plurality of storage boxes in which the package is stored at the second stop location,
- wherein the reservation further comprises an arrival time of the autonomous vehicle at the second specified location, identification information of the predetermined storage box for the package, and passcode information for opening the predetermined storage box, and presenting, at the receiver terminal, information for retrieving the package from the autonomous vehicle at the second specified location based on the reservation for the package; and transmitting, based on the reservation for the package and to the autonomous vehicle, a third stop instruction to stop at the second stop location and a fourth stop instruction to stop at the second specified location.

2. An information processing method executed by an information processing device, the information processing method comprising:

receiving movement information from an autonomous vehicle,
- wherein the autonomous vehicle is a locker vehicle that comprises a control system and a plurality of storage boxes coupled to a plurality of object detector sensors and a plurality of door open-close sensors,
- wherein the locker vehicle is operated in a regular run of traveling around a predetermined circulation route at a plurality of regular time intervals, and
- wherein the movement information is about movement of the autonomous vehicle around a plurality of stop locations of the predetermined circulation route;

receiving storage space information from the autonomous vehicle using the plurality of object detector sensors and the plurality of door open-close sensors, wherein the storage space information is about a presence of one or more packages in one or more storage spaces in the plurality of storage boxes;

receiving a reservation for a package from a depositor terminal associated with a first user;

determining whether a first user ID associated with the first user satisfies a first predetermined condition;

determining whether a second user ID associated with a second user satisfies a second predetermined condition;

obtaining, from the depositor terminal and in response to determining that the first user ID satisfies the first predetermined condition, a first specified location that is outside the predetermined circulation route,
- wherein the reservation for the package comprises the first specified location where the package is to be deposited in the autonomous vehicle and a predetermined storage box among the plurality of storage boxes in which the package is stored at the first specified location,
- wherein the reservation further comprises an arrival time of the autonomous vehicle at a first stop location among the plurality of stop locations of the predetermined circulation route, identification information of the predetermined storage box for the package, and passcode information for opening the predetermined storage box, and wherein the reservation is based on the movement information and the storage space information;

presenting, at a receiver terminal associated with the second user, information for retrieving the package from the autonomous vehicle at the first stop location of the predetermined circulation route preset on based on the reservation for the package;

transmitting, based on the reservation for the package and to the autonomous vehicle, a first stop instruction to stop at the first specified location and a second stop instruction to stop at the first stop location;

obtaining, from the receiver terminal and in response to determining that the first user ID does not satisfy the first predetermined condition and that the second user ID satisfies the second predetermined condition, a second specified location that is outside the predetermined circulation route, wherein the reservation for the package comprises a second stop location among the plurality of stop locations of the predetermined circulation route, wherein the package is to be deposited in the autonomous vehicle and a predetermined storage box among the plurality of storage boxes in which the package is stored at the second stop location, wherein the reservation further comprises an arrival time of the autonomous vehicle at the second specified location, identification information of the predetermined storage box for the package, and passcode information for opening the predetermined storage box, and presenting, at the receiver terminal, information for retrieving the package from the autonomous vehicle at the second specified location based on the reservation for the package; and transmitting, based on the reservation for the package and to the autonomous vehicle, a third stop instruction to stop at the second stop location and a fourth stop instruction to stop at the second specified location.

3. A non-transitory computer readable medium storing a program causing a computer to execute control processing, the computer controlling an information processing device, the program being configured to perform a method comprising:

receiving movement information from an autonomous vehicle, wherein the autonomous vehicle is a locker vehicle that comprises a control system and a plurality of storage boxes coupled to a plurality of object detector sensors and a plurality of door open-close sensors, wherein the locker vehicle is operated in a regular run of traveling around a predetermined circulation route at a plurality of regular time intervals, and wherein the movement information is about movement of the autonomous vehicle around a plurality of stop locations of the predetermined circulation route;

receiving storage space information from the autonomous vehicle using the plurality of object detector sensors and the plurality of door open-close sensors, wherein the storage space information is about a presence of one or more packages in one or more storage spaces in the plurality of storage boxes;

receiving a reservation for a package from a depositor terminal associated with a first user;

determining whether a first user ID associated with the first user satisfies a first predetermined condition;

determining whether a second user ID associated with a second user satisfies a second predetermined condition;

obtaining, from the depositor terminal and in response to determining that the first user ID satisfies the first predetermined condition, a first specified location that is outside the predetermined circulation route, wherein the reservation for the package comprises the first specified location where the package is to be deposited in the autonomous vehicle and a predetermined storage box among the plurality of storage boxes in which the package is stored at the first specified location, wherein the reservation further comprises an arrival time of the autonomous vehicle at a first stop location among the plurality of stop locations of the predetermined circulation route, identification information of the predetermined storage box for the package, and passcode information for opening the predetermined storage box, and wherein the reservation is based on the movement information and the storage space information;

presenting, at a receiver terminal associated with the second user, information for retrieving the package from the autonomous vehicle at the first stop location of the predetermined circulation route preset on based on the reservation for the package;

transmitting, based on the reservation for the package and to the autonomous vehicle, a first stop instruction to stop at the first specified location and a second stop instruction to stop at the first stop location;

obtaining, from the receiver terminal and in response to determining that the first user ID does not satisfy the first predetermined condition and that the second user ID satisfies the second predetermined condition, a second specified location that is outside the predetermined circulation route, wherein the reservation for the package comprises a second stop location among the plurality of stop locations of the predetermined circulation route, wherein the package is to be deposited in the autonomous vehicle and a predetermined storage box among the plurality of storage boxes in which the package is stored at the second stop location, wherein the reservation further comprises an arrival time of the autonomous vehicle at the second specified location, identification information of the predetermined storage box for the package, and passcode information for opening the predetermined storage box, and presenting, at the receiver terminal, information for retrieving the package from the autonomous vehicle at the second specified location based on the reservation for the package; and transmitting, based on the reservation for the package and to the autonomous vehicle, a third stop instruction to stop at the second stop location and a fourth stop instruction to stop at the second specified location.

* * * * *